Nov. 2, 1943.   F. H. VAN NEST   2,333,454
HYDRAULIC GOVERNING MECHANISM
Filed Dec. 5, 1941
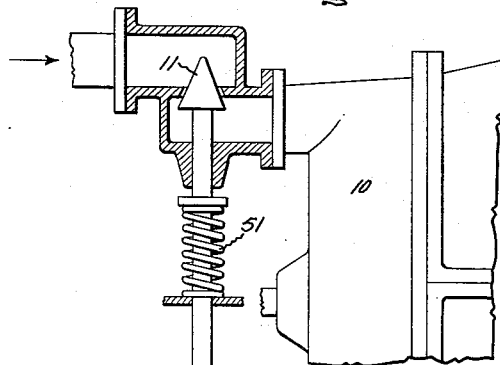
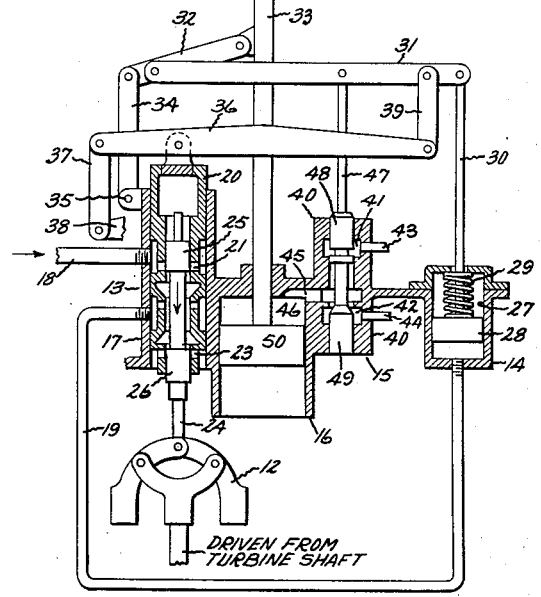
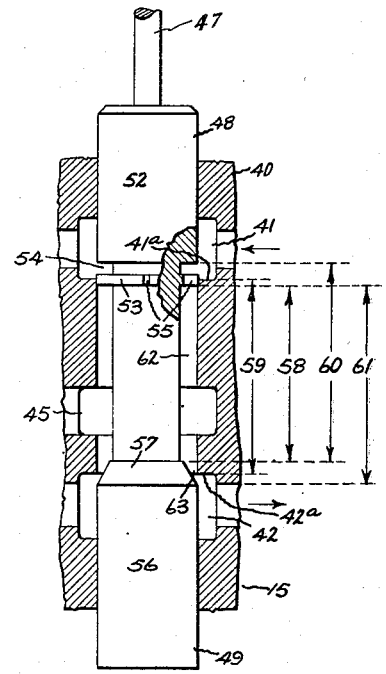
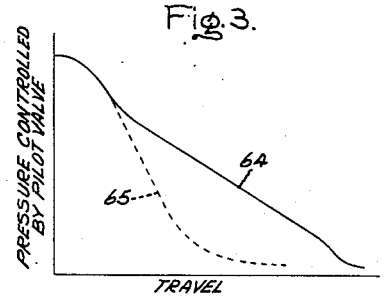
Inventor:
Francis H. Van Nest,
by Harry E. Dunham
His Attorney.

Patented Nov. 2, 1943

2,333,454

UNITED STATES PATENT OFFICE 2,333,454

HYDRAULIC GOVERNING MECHANISM

Francis H. Van Nest, Marblehead, Mass., assignor to General Electric Company, a corporation of New York Application December 5, 1941, Serial No. 421,765

2 Claims. (Cl. 121—46.5)

The present invention relates to hydraulic governing mechanisms including a hydraulic motor having a piston movably disposed in a cylinder and a balanced type pilot valve for controlling the flow of fluid under pressure to the motor and the discharge of fluid from the motor. The pilot valves at present generally used my be classified into orifice type and line-to-line positive cut-off type valves. Each of the two types has spaced valve heads secured to a stem and cooperatively arranged with ports in a casing. The orifice type pilot valve broadly constitutes a variable orifice for changing the fluid pressure in a hydraulic motor. In this type of valve the pressure chamber of the motor communicates continuously with the source of fluid pressure and upon movement of the valve heads a change of fluid pressure in the motor takes place. The rate of change of fluid pressure in the motor with respect to valve movement is a function of the area of the fixed orifice and the characteristics of the pilot valve or so-called variable orifice.

In the line-to-line positive cut-off type of valve the two valve heads are normally in a line-to-line position with their ports and thus normally substantially completely disconnect the motor from the source of supply of fluid pressure and also from the discharge port of the valve. In this type of arrangement no continuous flow of fluid under pressure through the pilot valve takes place. The arrangement accordingly is somewhat more economical. On the other hand, a slight movement of the valve causes a considerable change of fluid pressure in the hydraulic motor. With this type of valve very little can be done to vary the rate of change of fluid pressure with respect to pilot valve movement. The valve therefore is very sensitive to small changes in speed or other operating condition of a machine to be controlled which under certain conditions is undesirable.

The object of my invention is to provide an improved construction and arrangement of hydraulic governing mechanisms, in particular an improved construction and arrangement of pilot valves for controlling the hydraulic motor whereby the advantages of both types of valves above discussed are attained.

For a consideration of what I believe to be novel and my invention, attention is directed to the following description and the claims appended thereto in connection with the accompanying drawing.

In the drawing Fig. 1 illustrates a governing mechanism embodying my invention; Fig. 2 is a detailed view of a part of Fig. 1; and Fig. 3 is an explanatory view.

The arrangement of Fig. 1 comprises an elastic fluid turbine 10 with an inlet valve 11 for controlling the flow of fluid to the turbine. The valve 11 is controlled by a speed-governing mechanism in response to changes of turbine speed. This mechanism includes a speed governor 12 driven from the turbine and connected to a first pilot valve 13 for controlling the flow of fluid to a first motor 14. The motor 14 positions a second pilot valve 15, which latter controls the flow of operating fluid to a second motor 16 for positioning the valve 11.

The first pilot valve 13 is of the conventional positive cut-off type. It comprises an outer casing 17 which is connected by a pipe 18 to a source of fluid under pressure and by another pipe 19 to the motor 14. A bushing 20 is slidably disposed within the cylindrical casing 13 and forms inlet and discharge ports 21 and 23. A valve stem 24 with spaced valve heads 25 and 26 is movably disposed within the bushing 20 and connected to the governor 12. The valve heads 25 and 26 are arranged in cooperative relation with the ports 21 and 23 respectively. In the position shown there is no appreciable flow of oil through either pipe 18 or 19 as the ports 21 and 23 are closed by the heads 25 and 26 respectively. When the stem 24 is moved downward, port 23 is opened, allowing oil to drain from the motor 14 through the pipe 19. The hydraulic motor 14 has a cylinder 27 with a piston 28 movably disposed therein and biased in downward direction by a compression spring 29. The draining of oil from the motor 14 lowers the pressure on the piston 28 and causes it to move downward. When the stem 24 is moved upward, fluid is admitted to the motor 14 by the opening of port 21, causing a rise in pressure on the piston 28 which causes it to move upward.

The piston 28 of the motor 14 has a stem 30 connected to the right-hand end of a lever 31. The latter has a left-hand end pivotally connected to a link 32 which at its right-hand end is pivoted to a stem 33 of the valve 11 and at its left-hand end is connected by a link 34 to a fulcrum 35 formed on the pilot valve casing 17. The bushing 20 of the pilot valve 17 is pivotally connected to an intermediate point of another lever 36 which at its left-hand end is connected by a link 37 to a fulcrum 38 and at its right-hand end is pivoted by a link 39 to an intermediate point of the aforementioned lever 31.

The first pilot valve 17 and the first hydraulic motor serve to control the position of the second pilot valve 15. The latter broadly includes a casing 40 with an inlet port 41 and an outlet port 42. The port 41 has a lower or cut-off edge 41a and the port 42 has an upper or cut-off edge 42a. The inlet port 41 is connected by a pipe 43 to a source of fluid under pressure and the outlet or drain port 42 is connected to a drain or discharge pipe 44. A third port 45 formed by the pilot valve casing 40 intermediate the ports 41 and 42 communicates with a pressure chamber 46 of the second hydraulic motor 16. The flow of operating fluid through the aforementioned ports is controlled by a valve member having a stem 47 with spaced valve heads 48 and 49 cooperatively arranged with the ports 41 and 42 respectively. The stem 47 is pivotally connected to the lever 31.

The hydraulic motor 16 has a cylinder with a piston 50 movably disposed therein and forming with the cylinder the aforementioned pressure chamber 46. The piston 15 has a stem which forms a continuation of the turbine valve stem 33. The stem 33 is biased in closing direction of the valve 11 by a compression spring 51.

The pilot valve 15 according to my invention is arranged normally to function as an orifice type mechanism, permitting a continuous flow of fluid between its inlet and outlet ports, and to cause a slow rate of change of fluid pressure in the motor with respect to movement of the pilot valve heads and finally to act as a positive cut-off mechanism to disconnect either the inlet or the outlet port of the pilot valve during certain operating conditions. To this end the pilot valve head 48 has a main cylindrical portion 52 and an auxiliary portion 53 spaced from the main portion 52 and forming a groove 54 between them. The portion 53 has a plurality of circumferentially spaced slots 55. The lower pilot valve head 49 has a main cylindrical portion 56 and another conical portion 57 forming a continuation of the cylindrical portion 56 and facing the upper pilot valve head. The adjacent faces of the two pilot valve heads are spaced a distance marked 58 which is smaller than the distance 59 between the cut-off edges of inlet port 41 and the outlet port 42. The distance 59 between the adjacent edges of the two ports is about equal to the distance 60 between the lower face of the main portion 52 of the upper head and the upper face of the conical portion 57 of the lower head, and also about equal to the distance 61 between the lower face of the portion 53 of the upper head and the upper face of the cylindrical portion 56 of the lower head. From another viewpoint, the lower face of the portion 53 is spaced from the lower face of the portion 52 a distance equal to the axial length of the conical portion 57 of the lower head.

The pilot valve 15 is shown in Figs. 1 and 2 in its normal operating position corresponding to the line-to-line positive cut-off position of an ordinary pilot valve. In this position, as pointed out above, a small amount of operating fluid is circulated through the valve entering the inlet port 41 and passing through the annular groove 54 and the slots 55 into the space 62 formed between the intermediate portion of the valve member and the casing, whence the fluid is discharged through the small clearance 63 formed between the portion 57 of the lower valve head and the cut-off edge 42a of the drain port 42. Under normal operating conditions the small movements of the pilot valve stem 47 are insufficient to bring either the lower face of the head 52 or the lower face of the ring 53 opposite the cut-off edge 41a of port 41. Slight movement of the valve will not affect the flow of fluid through the slots 55. Under such conditions the pressure applied to the piston 50 is controlled entirely by the clearance at 63 since fluid can enter the chamber 62 only through the fixed area of the slots 55. Thus a relatively slow rate of change of pressure with respect to pilot valve travel, as illustrated by a curve 64 in Fig. 3, can be obtained.

Under abnormal conditions larger travels of the pilot valve are produced and upon a large upward movement of the pilot valve the clearance 63 is reduced to a minimum, thus effecting an increase in pressure in the space 62. The restriction to flow from the port 41 to the space 62 remains about constant until the lower face of the portion 53 of the upper valve head leaves the cut-off edge 41a of the inlet port 41. At the same time the main portion 56 of the lower valve head engages the cut-off edge 42a of the drain port 42, thus completely disconnecting the drain port. During such condition all of the oil entering the inlet port 41 is forced through the port 45 to the pressure chamber 46 of the hydraulic motor 16. The valve then operates like an ordinary pilot valve.

Similarly, during downward movement of the valve heads the restriction 63 is gradually increased, thus causing a decrease in pressure in the space 62 and draining of fluid from the pressure chamber 46 of the hydraulic motor 16. In a certain position during downward movement the cylindrical main portion 52 of the upper valve head engages the cut-off edge 41a of the inlet port 41, thus completely disconnecting the source of pressure from the hydraulic motor. The increased annular clearance 63 at the lower valve head then causes fast draining of fluid from the pressure chamber 46. The characteristics of the pilot valve are illustrated in Fig. 3 in which the curve 64 shows the relation between pilot valve travel and the pressure controlled by the pilot valve, that is, the pressure in the pressure chamber 46. The dash-dotted curve 65 shows the same relation with respect to the ordinary line-to-line positive cut-off valve.

The operation of the mechanism shown in Fig. 1 as a whole is as follows: An increase in speed causes downward movement of the valve heads 25, 26 whereby the pressure in the pressure chamber of the motor 14 is reduced and the piston 28 is moved downward by action of the compression spring 29, thus turning the lever 31 in clockwise direction about its left-hand end and moving the pilot valve heads 48, 49 of the second pilot valve 15 downward. This causes a drop in pressure in the pressure chamber 46 of the second hydraulic motor 16 and upward movement of the stem 33 and closing movement of the valve 11 by action of the compression spring 51. Downward turning movement of the lever 31 about its left-hand end also causes downward turning movement of the lever 36 about its left-hand end whereby the bushing 20 of the first pilot valve 13 is moved downward to restore the normal relative position between the valve heads 25, 26 and the bushing 20. Likewise, upward movement of the valve stem 33 causes clockwise turning movement of the lever 31 about its right-hand end, thereby restoring the valve heads 48, 49 of the second pilot valve head 15 to their normal position shown.

Upon a decrease in speed the operation of the mechanism is similar except that the various elements move in a direction opposite to that described above to effect opening of the valve 11.

With a pilot valve according to my invention a small dead band is introduced so that the governor will not respond to very small changes in speed or other operating condition as may be caused for example by the normal pulsations in torque of a propeller shaft of a ship. It is well known that all hydraulic motors of the piston type have a certain amount of inherent friction requiring a definite change in oil pressure to overcome the friction and to cause movement of the piston. This change in pressure may vary in practical applications from 5 to 15 lbs. per square inch. When a pilot valve with a slow rate of change of pressure with respect to movement is used in conjunction with such hydraulic motor the pilot valve must be moved an appreciable amount before any movement of the motor piston is produced, thus introducing the desired dead band mentioned above.

Thus, with my invention I have accomplished an improved construction and arrangement of pilot valves for hydraulic governing mechanisms for directly or remotely controlling a machine element such as a turbine valve in response to changes in operating conditions. A valve according to my invention broadly has two elements movable relative to each other, one forming a cylindrical bore with spaced inlet and outlet ports and the other element has a stem with two spaced valve heads in cooperative relation with the ports. The heads are constructed and arranged normally to permit a small flow of operating fluid through the valve and upon movement of the heads to cause a slow change of fluid pressure in the valve and the hydraulic motor connected thereto. In case a governing mechanism, as in the example described above, includes several servo motors controlled by pilot valves, it is sufficient if one of the valves is constructed in accordance with my invention and the other valves may be of the ordinary type, that is, either of the orifice type or line-to-line positive cut-off type.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A pilot valve having a casing with a bore and axially spaced ports, and a stem with axially spaced heads slidably disposed in the bore in cooperative relation with the ports, each head having a main cylindrical portion, the main portions having adjacent ends spaced apart a distance greater than the distance between the cut-off edges of the ports, one of the valve heads having another cylindrical portion with axial slots spaced from the main portion to form a groove between them, the other head having a conical extension facing said slotted cylindrical portion.

2. A pivot valve for controlling a hydraulic motor comprising a cylindrical casing having spaced inlet and outlet ports, a stem with two valve heads for controlling the flow of fluid through said ports, the valve heads each having a cylindrical portion, said portions having adjacent faces spaced a distance slightly greater than that between the cut-off edges of the ports in the normal position of the valve substantially to cover the respective ports, and means associated with at least one of the valve heads and facing the other head for effcting a gradual change in flow of operating fluid upon the valve being moved away from its normal operating position, said means comprising an axially slotted cylindrical portion formed on the valve stem and slightly spaced from one of the first mentioned cylindrical portions to form an annular groove therewith.

FRANCIS H. VAN NEST.